United States Patent
Gaydos

(10) Patent No.: US 6,389,945 B1
(45) Date of Patent: *May 21, 2002

(54) SAW BLADE FOR FORMING CURVED STOCK

(76) Inventor: George G. Gaydos, 509 Peebles, Apt. No. 3, Pittsburgh, PA (US) 15221

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/482,091
(22) Filed: Jan. 13, 2000

Related U.S. Application Data

(63) Continuation-in-part of application No. 08/916,509, filed on Aug. 22, 1997.

(51) Int. Cl.7 .............................................. B27B 33/02
(52) U.S. Cl. ........................................ 83/846; 83/835
(58) Field of Search ....................... 83/836, 840, 841, 83/854, 855, 835, 846, 875, 839; 407/40, 34, 42, 46; 409/25, 26, 27

(56) References Cited

U.S. PATENT DOCUMENTS

| | | | |
|---|---|---|---|
| 60,321 A | * 12/1866 | Atwood | 83/845 |
| 162,061 A | * 4/1875 | Hale | 83/841 |
| 2,394,222 A | * 2/1946 | Wildhaber | 409/25 |
| 2,464,915 A | * 3/1949 | Wildhaber | 409/25 |
| 2,633,775 A | * 4/1953 | Wildhaber | 409/25 |
| 2,646,726 A | * 7/1953 | Fogg | 407/34 |
| 3,885,488 A | * 5/1975 | Evancic et al. | 83/835 |
| 4,501,184 A | * 2/1985 | Scott et al. | 83/834 |
| 4,587,876 A | * 5/1986 | Erhardt | 83/839 |
| 5,794,503 A | * 8/1998 | Asada | 83/835 |
| 6,004,078 A | * 12/1999 | Clark et al. | 409/25 |

* cited by examiner

*Primary Examiner*—M. Rachuba
*Assistant Examiner*—Kim Ngoc Tran
(74) *Attorney, Agent, or Firm*—Carothers & Carothers

(57) ABSTRACT

Curved stock is formed from flat stock by cutting a side-by-side series of V-shaped grooves in the face of a piece of flat stock to be curved with a saw blade having triangular cutting teeth. The cut is made to a predetermined depth so that the opposed face of the stock may be curved such that the V-shaped grooves are closed flush or at least partially closed. The resultant outer opposed curved face is thereby left free of any unsightly or undesirable ridges.

3 Claims, 3 Drawing Sheets

SAW BLADE FOR FORMING CURVED STOCK

CROSS REFERENCE

This application is a continuation-in-part of patent application Ser. No. 08/916,509, filed Aug. 22, 1997.

BACKGROUND OF THE INVENTION

The present invention relates generally to saw blades and more particularly to saw blades for forming curved stock from flat stock.

When it is desired to form curved stock from flat pieces of stock, the conventional technique is to cut a series of adjacent or side by side grooves in one face of the stock to a predetermined depth in the stock such that the opposed face of the stock may be curved by bending the stock to at least partially close the grooves. This prior art technique is illustrated in FIGS. 1 and 2.

Referring to FIG. 1, the piece of flat stock 10 is provided with a side by side series of saw cut grooves 11 cut by a conventional hand saw, or more commonly with a conventional circular saw blade to a predetermined depth D in a one face 12 of the stock 10. The depth D is made sufficient so that the opposed face 13 of the stock 10 may be curved as illustrated in FIG. 2.

The problem encountered with this method is that conventional saw cuts provide or leave rectangular grooves 11 as illustrated in FIG. 1, and when the stock is bent or curved as illustrated in FIG. 2, this provides unwanted longitudinal ridges along face 13 at stress points 14 providing an undesirable and unsightly curved surface 13.

It is a principal object of the present invention to provide a saw blade for forming curved stock which eliminates these aforementioned disadvantages.

SUMMARY OF THE INVENTION

The saw blade of the present invention has a series of cutting teeth along an edge of the blade for saw cutting stock wherein the teeth have a triangular cross section for cutting a V-shaped groove in the stock.

While the saw blade may be a flat hand saw blade, more preferably it is provided in the form of a circular saw blade wherein the base of the teeth may be alternatively offset to prevent binding when cutting stock. The front cutting faces of these teeth are triangular.

Curved stock in accordance with the teachings of the present invention is formed from flat stock by cutting a side by side series of V-shaped grooves, either in parallel or in a fan shaped configuration, in one face of a piece of stock to be curved to a predetermined depth whereby the opposed face of the stock may be curved. The stock is then curved whereby the V-shaped grooves are at least partially closed. The stock may be sufficiently curved to thereby create flush seams in the V-shaped grooves, which may be preglued if desired.

The saw blade of the present invention has a series of saw cutting teeth protruding from an edge of the blade for cutting stock when the blade edge is moved in one direction against the stock to be cut. The saw teeth each have a triangular face perpendicular to the blade edge and face in the one direction with the triangular faces outwardly decreasing from the edge of the blade to an apex. The apex of all of the teeth are aligned with respect to each other for thereby cutting a V-shaped groove in stock.

The saw teeth are of uniform shape and configuration and each of the triangular front cutting faces having side edges leading from the apex of the tooth and the bases or bottoms of the teeth may be offset such that the side edges of the teeth are alternately staggered in alignment for prevention of saw cut binding. In this configuration, nevertheless, the apex of all teeth must be maintained in perfect alignment to provide a V-cut in the stock.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF A PREFERRED EMBODIMENT

Figure 1:
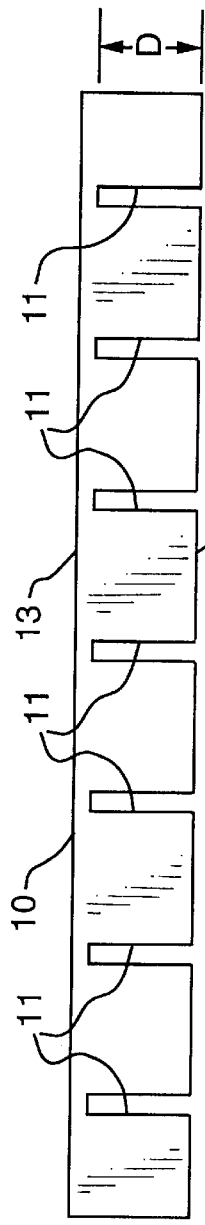
FIG. 1 is an edge view of a flat piece of stock cut in accordance with the teachings of the prior art to form a curved piece of stock therefrom.
Figure 2:
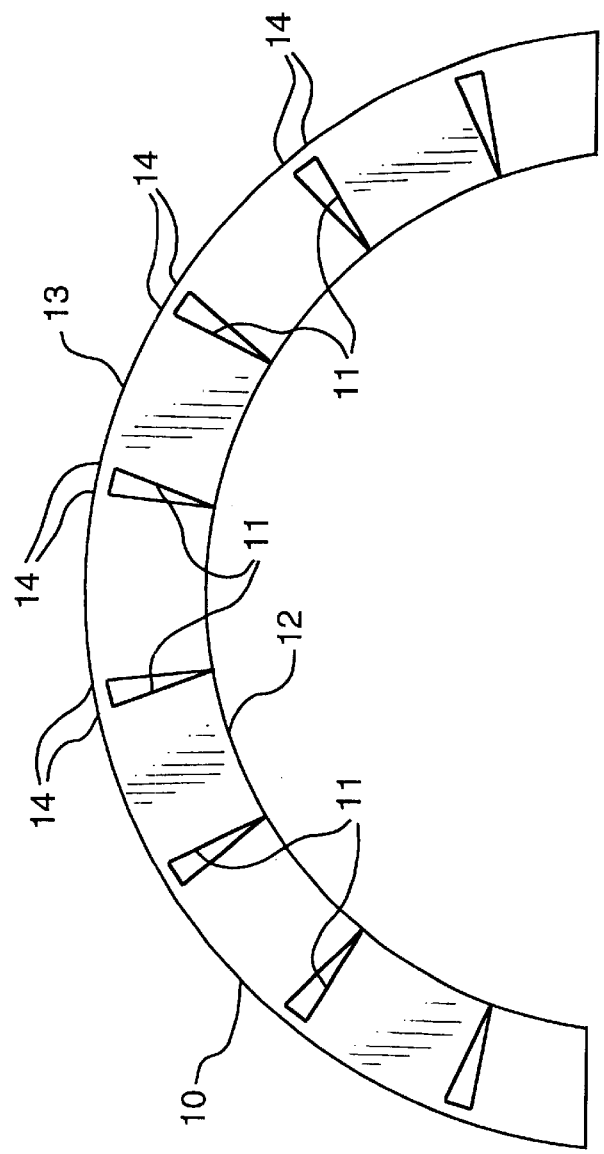
FIG. 2 is an edge view of the piece of stock shown in FIG. 1 illustrating the flat piece of stock formed to create a curved or arched piece of stock in accordance with the teachings of the prior art.
Figure 3:
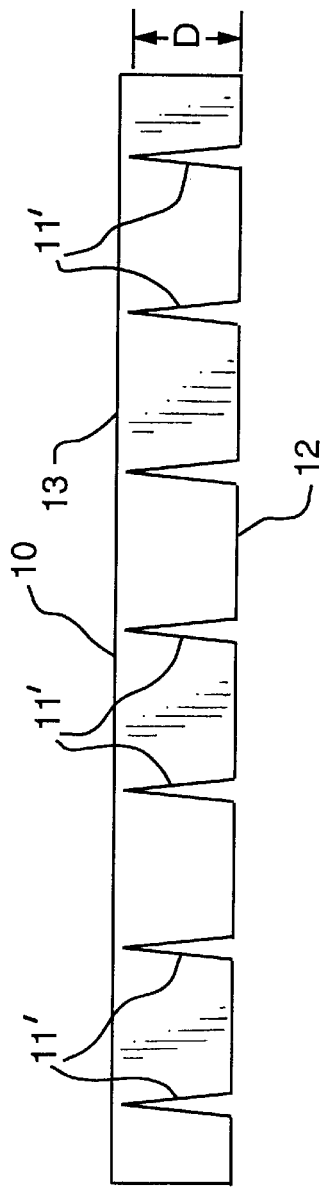
FIG. 3 is an edge view of a flat piece of stock cut in accordance with the teachings of the method of the present invention to form a curved piece of stock therefrom.
Figure 4:
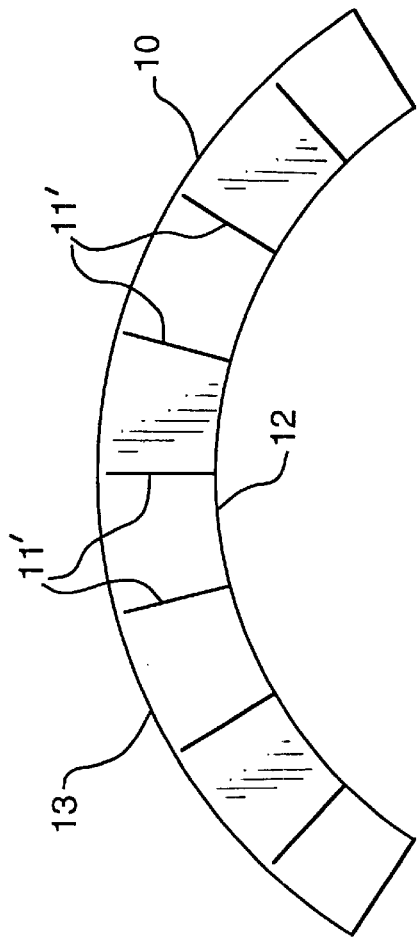
FIG. 4 is an edge view of the piece of stock illustrated in FIG. 3, but formed in the shape of a curve or arch in accordance with the teachings of the apparatus and method of the present invention.

Referring to FIGS. 3 and 4, identical parts to those illustrated in FIGS. 1 and 2 are designated with the same reference numeral.

In FIG. 3, the flat stock 10 is shown to be prepared in accordance with the teachings of the present invention for curving the stock to the final configuration illustrated in FIG. 4.

A side by side series of V-shaped groove 11' are cut in face 12 of the stock 10 to be curved to a predetermined depth D whereby the opposed face 13 of the stock may be curved as illustrated in FIG. 4. The stock 10 is then curved as illustrated in FIG. 4 whereby the V-shaped grooves are at least partially closed.

In this illustration, the V-shaped grooves 11' are completely closed to create flush seams. These seams may be glued if desired.

The result is that in the final curved product shown in FIG. 4, the outer curved face 13 which is exposed in the product has a smooth face with no unsightly ridges as is experienced in the prior art structure of FIG. 2 and there indicated at stress points 14.

Figure 5:
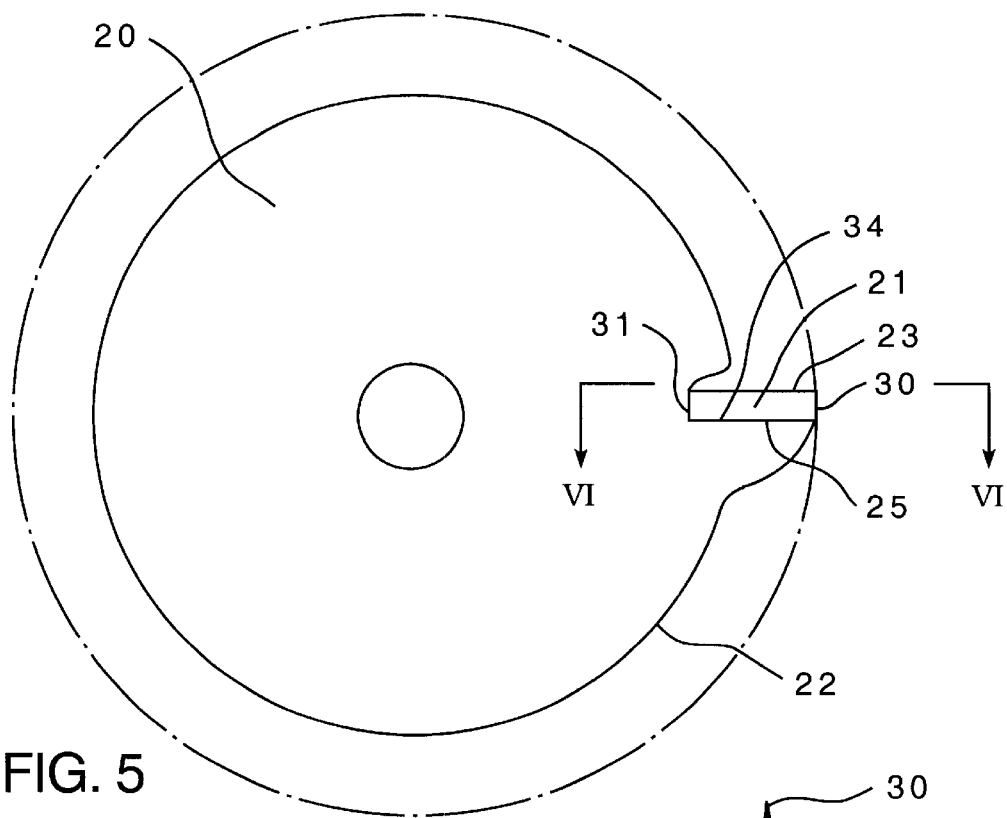
FIG. 5 is a schematic view in side elevation of a circular saw blade of the present invention with only one of the blade teeth of fourteen being fully illustrated for simplicity and convenience.
Figure 6:
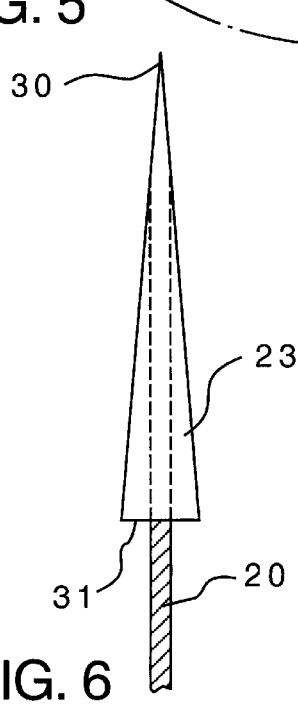
FIG. 6 is an enlarged view in front elevation of the saw blade tooth shown in FIG. 5 as seen along section line VI—VI.
Figure 7:
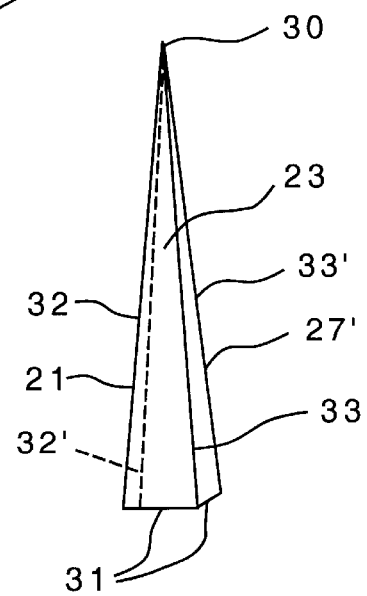
FIG. 7 is a schematic and diagrammatic representation in front elevation of two saw blade teeth of the saw blade shown in FIG. 5 in tandem or front and back alignment as they would appear on a blade of the present invention for illustrating the staggering of the bases of alternate teeth for prevention of saw cut binding.

Referring next to the remaining FIGS. 5 through 7, the saw blade 20 of the present invention is provided with a series (fourteen uniformly spaced teeth in all, with only one here illustrated) of triangular cutting teeth 21 along edge 22 of the blade for saw cutting stock, such as stock 10 illustrated in FIGS. 3 and 4 to provide V-shaped grooves 11'. The bases 31 of teeth 21 are alternately offset (1° for example) to prevent binding when cutting grooves 11' as is best illustrated in FIG. 7.

In FIG. 7, two teeth 21 and 21' are illustrated in a row or in tandem as they would be presented on an edge 22 of a saw blade. Note that the bases 31 of the two teeth are alternately offset such that the side edges 32 and 33 of tooth 21 are staggered or misplaced in alignment as illustrated from the side edges 32' and 33' for tooth 21'. This is carried out alternately for all fourteen teeth. However, while bases 31 of the teeth 21 are alternately offset, nevertheless, the apexes 30 of the teeth remain perfectly aligned for cutting a V-shaped groove in stock.

The teeth 21 are carbide tips having triangular front cutting faces 23. The triangular back face 25 of the teeth 21 are welded to edges 34 of the blades recesses illustrated.

The saw blade of the present invention may also be provided in the form of a straight line hand saw, but is more useful when supplied in the form of a circular saw blade as illustrated.

The saw blade teeth 21 may be formed from the material of the circular blade 20 itself instead of being welded thereto in the form of carbide tips.

I claim:

1. A circular saw blade having a series of saw cutting teeth protruding radially from an annular edge of the blade for cutting stock when the teeth on said blade edge are moved in one direction against stock to be cut, said teeth each having a substantially triangular face perpendicular to the blade edge and with side cutting edges and facing said one direction with said face outwardly decreasing from said edge in a substantially straight line V-shaped configuration to an apex, the apex of said teeth annularly aligned with respect to each other in a circle for thereby cutting a substantially straight sided V-shaped groove in stock.

2. The saw blade of claim 1 wherein said teeth are carbide steel teeth secured to the circular steel saw blade.

3. The saw blade of claim 2 wherein said teeth are of uniform configuration and each of said triangular faces are of equal size and shape and said cutting side edges leading from said apex, and base portions of the teeth adjacent said annular edge are alternately staggered in alignment while the apex of said teeth remain in alignment for prevention of saw cut binding.

* * * * *